United States Patent [19]
Jorgenson

[11] Patent Number: 5,443,191
[45] Date of Patent: Aug. 22, 1995

[54] PORTABLE VEHICLE-MOUNTED GUN RACK

[76] Inventor: Darwyn J. Jorgenson, Rte. 1 Box 155, Emery, S. Dak. 57332-9761

[21] Appl. No.: 231,819

[22] Filed: Apr. 25, 1994

[51] Int. Cl.$^6$ .............................................. B60R 7/14
[52] U.S. Cl. ........................... 224/543; 224/275; 224/913; 224/546; 224/571; 224/560; 211/64
[58] Field of Search ............ 224/275, 42.42, 42.45 R, 224/42.46 B, 913; 211/64

[56] References Cited

U.S. PATENT DOCUMENTS

| | | | |
|---|---|---|---|
| 3,477,586 | 11/1969 | Haluska | 211/64 |
| 3,497,077 | 2/1970 | Sjostrand | 211/64 |
| 3,706,403 | 12/1972 | Sikes | 224/42.42 X |
| 3,767,094 | 10/1973 | Sikes | 224/275 |
| 4,579,263 | 4/1986 | Ehmke et al. | 224/42.42 |
| 4,852,780 | 8/1989 | Woodbury | 224/42.45 R |
| 4,957,230 | 9/1990 | Gonzales | 224/275 X |

*Primary Examiner*—J. Casimer Jacyna

[57] ABSTRACT

Disclosed is a new portable vehicle-mounted gun rack, for use in vehicles having a floor with at least one generally horizontal planar portion situated generally in front of a bench seat having an upwardly projecting backrest, for supporting a plurality of long-barreled firearms for safe transport whereby the firearms are readily accessible and no modification is required to the vehicle. The portable vehicle-mounted gun rack comprises a lower floor engagable support structure for receiving a plurality of guns by the muzzle. The lower support structure comprises an elongated block having a plurality of spaced apart upwardly opening gun muzzle sockets formed therein whereby the plurality of guns may be partially supported by their downwardly angled muzzles. An upper seat backrest engagable support structure for receiving the plurality of guns by the butt is also included. The upper support structure comprises an elongated block having a plurality of spaced apart front facing lateral gun butt slots formed therein whereby the plurality of guns may be supported by their upwardly angled butts. The upper support structure has hanger brackets attached to the back face of the block whereby the upper support may be hooked over the top front edge of the vehicle seat backrest. The upper support structure is cooperably aligned with the lower support structure so the combined support structures in combination with the vehicle floor and seat backrest define a rack wherein the guns are firmly held in bridging fashion between the upper and lower support structures.

7 Claims, 4 Drawing Sheets

1

PORTABLE VEHICLE-MOUNTED GUN RACK

BACKGROUND OF THE INVENTION

1. Field of the Invention

The present invention relates to gun racks and more particularly pertains to a portable vehicle-mounted gun rack which may be adapted for supporting a plurality of long-barreled firearms for safe vehicular transport whereby the firearms are readily accessible and no modification is required to the vehicle.

2. Description of the Prior Art

The use of gun racks is known in the prior art. More specifically, gun racks heretofore devised and utilized for the purpose of supporting firearms safely and conveniently are known to consist basically of familiar, expected and obvious structural configurations, notwithstanding the myriad of designs encompassed by the crowded prior art which have been developed for the fulfillment of countless objectives and requirements.

The present invention is directed to improving devices for supporting firearms safely and conveniently in a manner which is secure, economical and aesthetically pleasing.

U.S. Pat. No. 3,477,586 to Haluska describes a portable gun rack for holding a plurality of guns for safe transport, particularly when carried in an automobile or other vehicle. The rack is adjustable in width and length to adapt it to a wide variety of conditions and gun sizes. The rack may also be carried manually or used as a storage rack. The gun rack described, while being basically functionally similar to the present invention, accomplishes it's objectives with a complex assemblage of numerous interconnected parts which leads to a high cost to manufacture, thus to market.

The prior art also discloses a front floor mounted and seat attached vehicle gun rack as shown in U.S. Pat. No. 3,635,381 to Hensley and a gun rack for a vehicle of U.S. Pat. No. 4,120,436 to Burch. Both of these inventions describe a gun rack for a single gun only. Neither disclosure shows a way to support a plurality of guns.

Two other pertinent patents are U.S. Pat. No. 3,857,491 to Townsend et al. which shows a vehicle mounted gun rack and U.S. Pat. No. 4,450,989 to Bogar, Jr. which shows a gun rack for motor vehicles. Neither of the devices disclosed is suitable for use in automobiles or in trucks with sliding rear windows.

In this respect, the portable vehicle-mounted gun rack according to the present invention substantially departs from the conventional concepts and designs of the prior art, and in so doing provides an apparatus primarily developed for the purpose of supporting a plurality of long-barreled firearms for safe vehicular transport whereby the firearms are readily accessible and no modification is required to the vehicle.

Therefore, it can be appreciated that there exists a continuing need for a new portable vehicle-mounted gun rack which can be used for supporting a plurality of long-barreled firearms for safe vehicular transport whereby the firearms are readily accessible and no modification is required to the vehicle. In this regard, the present invention substantially fulfills this need.

As illustrated by the background art, efforts are continuously being made in an attempt to develop devices for supporting firearms safely and conveniently. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of gun racks now present in the prior art, the present invention provides a new gun rack construction wherein the same can be utilized for supporting a plurality of long-barreled firearms for safe vehicular transport whereby the firearms are readily accessible and no modification is required to the vehicle. As such, the general purpose of the present invention, which will be described subsequently in greater detail, is to provide a new portable vehicle-mounted gun rack apparatus and method which has all the advantages of the prior art gun racks and none of the disadvantages.

The invention is defined by the appended claims with the specific embodiment shown in the attached drawings. For the purpose of summarizing the invention, the invention may be incorporated into a new portable vehicle-mounted gun rack, for use in vehicles having a floor with at least one generally horizontal planar portion situated generally in front of a bench seat having an upwardly projecting backrest, for supporting a plurality of long-barreled firearms for safe transport whereby the firearms are readily accessible and no modification is required to the vehicle. The portable vehicle-mounted gun rack comprises a lower floor engagable support structure for receiving a plurality of guns by the muzzle. The lower support structure comprises an elongated block formed of dense rigid material having a plurality of spaced apart upwardly opening gun muzzle sockets formed therein. The sockets are positioned longitudinally along the top face of the block. The sockets are also parallel with respect to each other and angled laterally with respect to the block whereby the plurality of guns may be partially supported by their downwardly angled muzzles when the block is placed on the vehicle floor in front of and parallel with the vehicle seat. The block additionally has a non-slip covering disposed over the bottom face thereof whereby enhancing frictional engagement of the block with the vehicle floor to preclude unwanted movement of the lower support across the surface of the floor.

An upper seat backrest engagable support structure for receiving the plurality of guns by the butt is also included in the new gun rack. The upper support structure comprises an elongated block formed of dense rigid material having a plurality of spaced apart front facing lateral gun butt slots formed therein. The slots are positioned longitudinally along the front face of the block and have the same spacing as the gun muzzle sockets of the lower support structure. The slots are also parallel with respect to each other and angled laterally with respect to the block whereby the plurality of guns may be supported by their upwardly angled butts when the block is positioned horizontally against the front surface of the vehicle seat backrest near the top edge thereof. The upper support structure additionally has a hanger bracket attached to the back face of the block near both ends thereof whereby the upper support may be removedly suspended from the top edge of the vehicle seat backrest so to be positioned horizontally against the front surface near the top edge thereof. The hanger brackets are identical to each other, each hanger bracket comprising an inverted generally U-shaped hook member formed of resilient material. The hook member has dimensions to fit over the top edge of a conventional vehicle bench seat backrest. The hook member also has a non-slip covering disposed over the inside surface thereof whereby enhancing frictional engagement of the hook member with the seat backrest to preclude unwanted movement of the upper support relative the backrest. The upper support structure is cooperably aligned with the lower support structure so the combined support structures in combination with the vehicle floor and seat backrest define a rack wherein the guns are firmly held in bridging fashion between the upper and lower support structures.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a portable vehicle-mounted gun rack for safely transporting a plurality of long-barreled firearms.

It is another object of the present invention to provide a new portable vehicle-mounted gun rack which may be easily and efficiently manufactured and marketed.

It is a further object of the present invention to provide a new portable vehicle-mounted gun rack which is of a durable and reliable construction.

An even further object of the present invention is to provide a new portable vehicle-mounted gun rack which is susceptible of a low cost of manufacture with regard to both materials and labor, and which accordingly is then susceptible of low prices of sale to the consuming public, thereby making such portable vehicle-mounted gun racks economically available to the buying public.

Still yet another object of the present invention is to provide a new portable vehicle-mounted gun rack which provides in the apparatuses and methods of the prior art some of the advantages thereof, while simultaneously overcoming some of the disadvantages normally associated therewith.

Still yet another object of the present invention is to provide a new portable vehicle-mounted gun rack for supporting a plurality of firearms whereby the firearms are readily accessible.

Yet another object of the present invention is to provide a new portable vehicle-mounted gun rack that does not attach directly to the vehicle thereby providing a rack easily moved from vehicle to vehicle and which requires no modification to the vehicle.

Even still another object of the present invention is to provide a new portable vehicle-mounted gun rack that can be used in cars, trucks, and trucks with sliding rear windows.

Yet still another object of the present invention is to provide a new portable vehicle-mounted gun rack that will protect the firearms from scratching and marring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
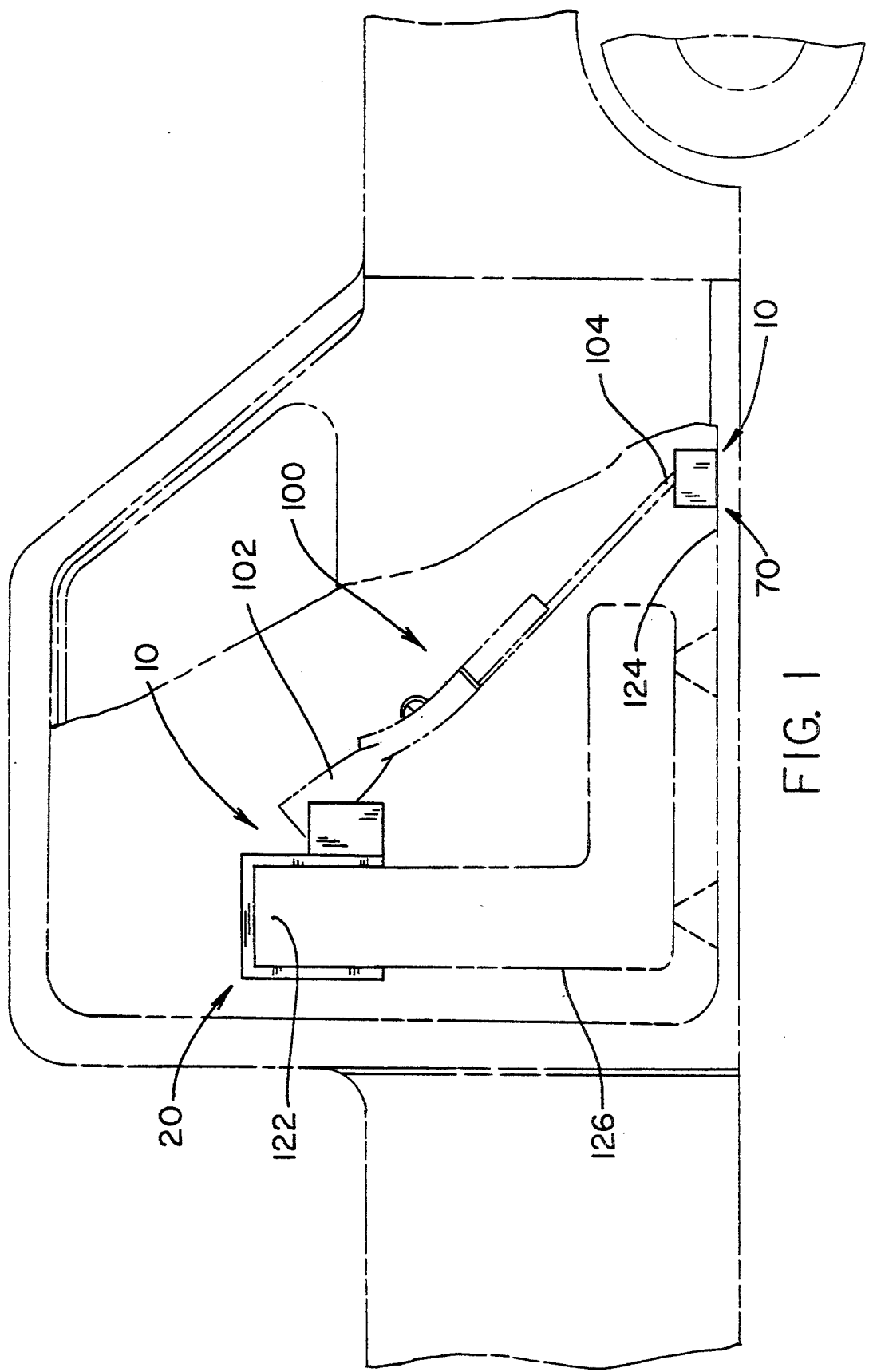
FIG. 1 is a right side elevational view of the new portable vehicle-mounted gun rack showing its manner of use in a typical pickup truck.
Figure 2:
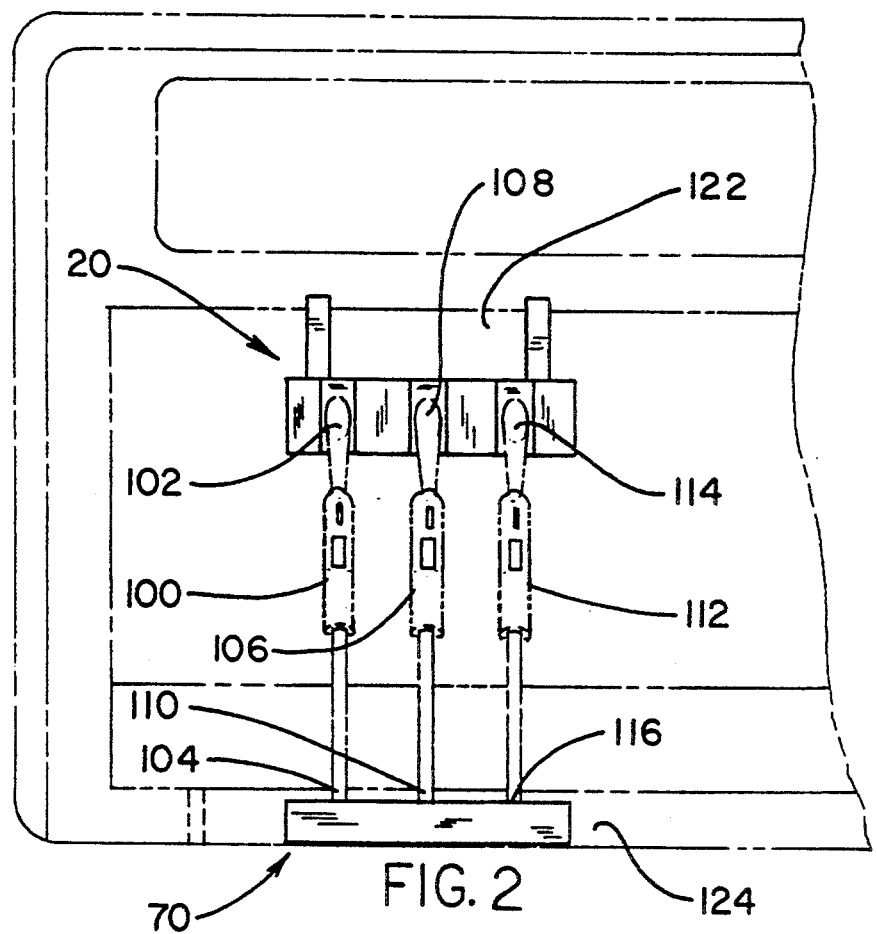
FIG. 2 is a front elevational view of the invention of FIG. 1.
Figure 3:
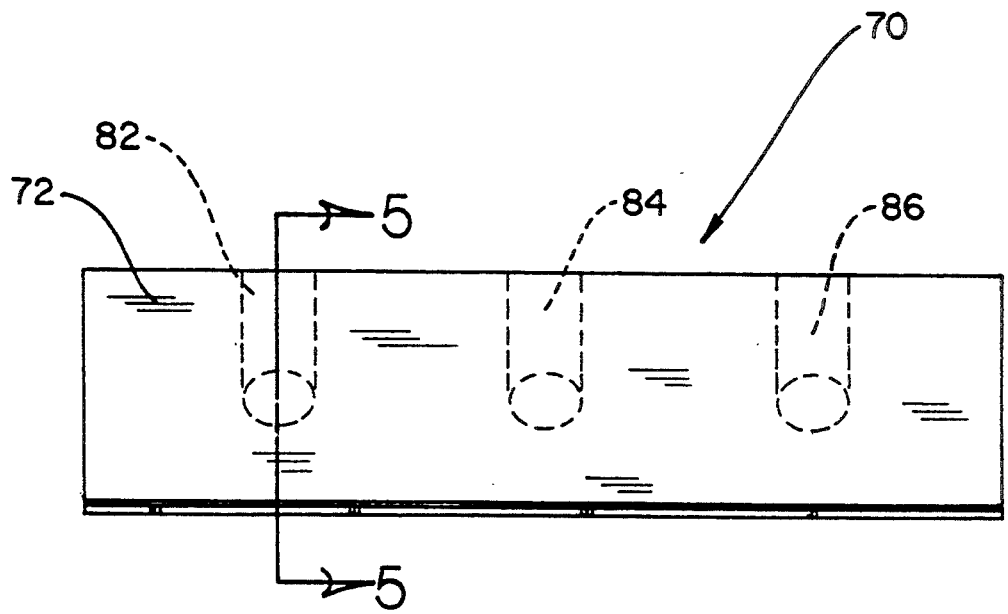
FIG. 3 is a front elevational view of the lower support structure of the present invention.
Figure 4:
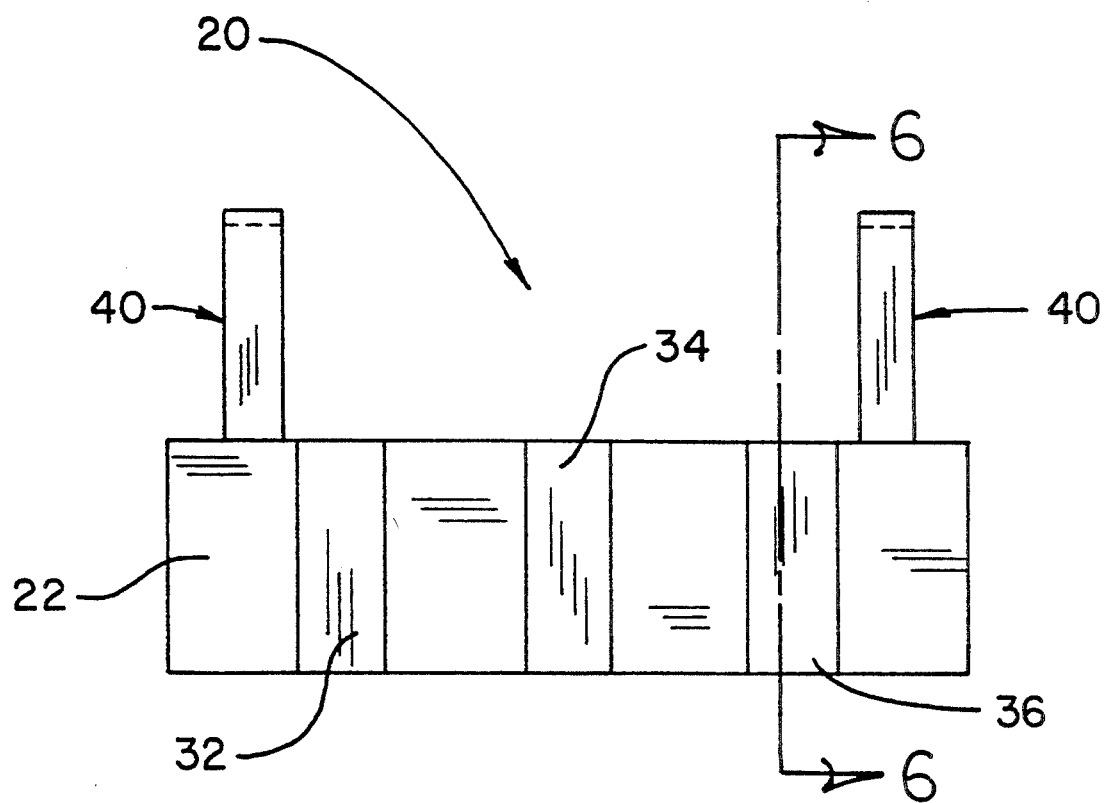
FIG. 4 is a front elevational view of the upper support structure of the present invention.
Figure 5:
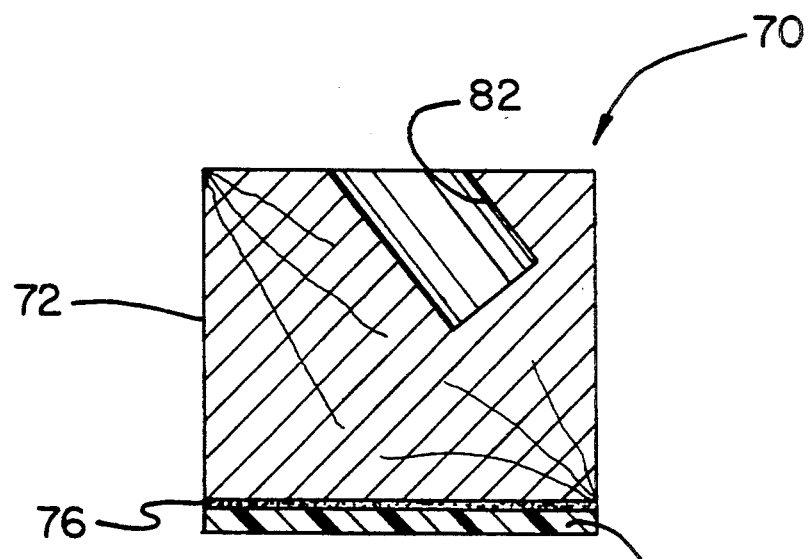
FIG. 5 is a sectional view of the invention of FIG. 3 taken along the line 5—5.
Figure 6:
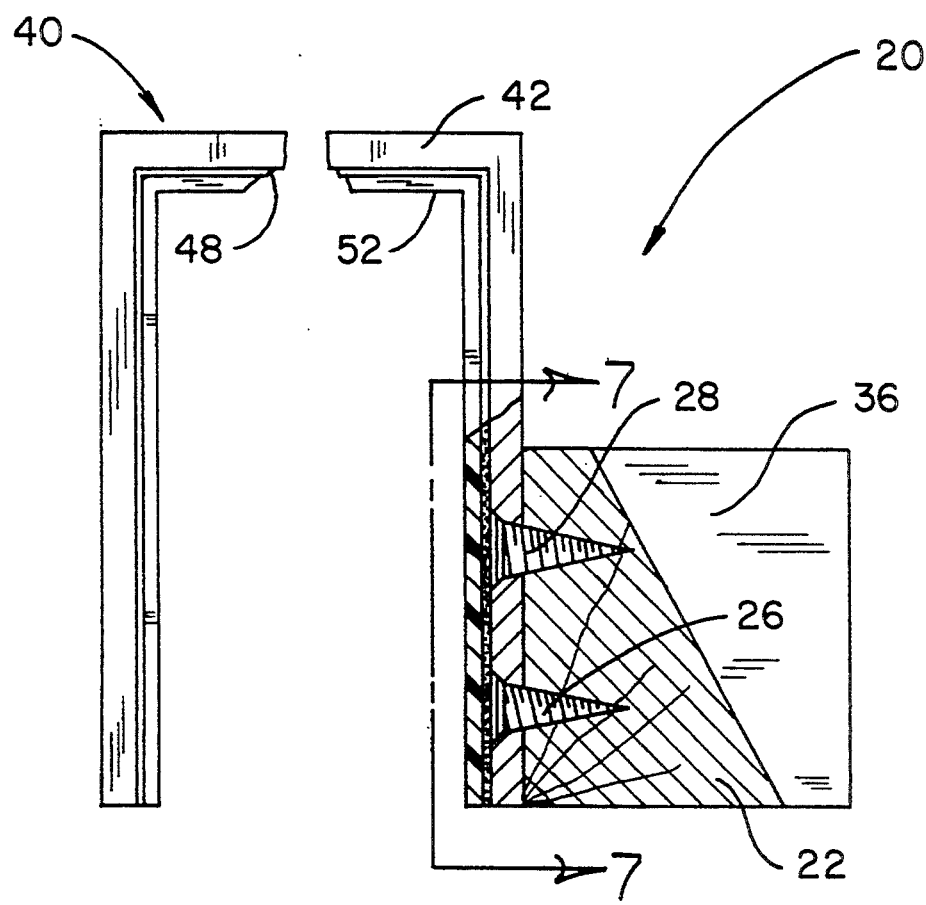
FIG. 6 is a sectional view of the invention of FIG. 4 taken along the line 6—6.
Figure 7:
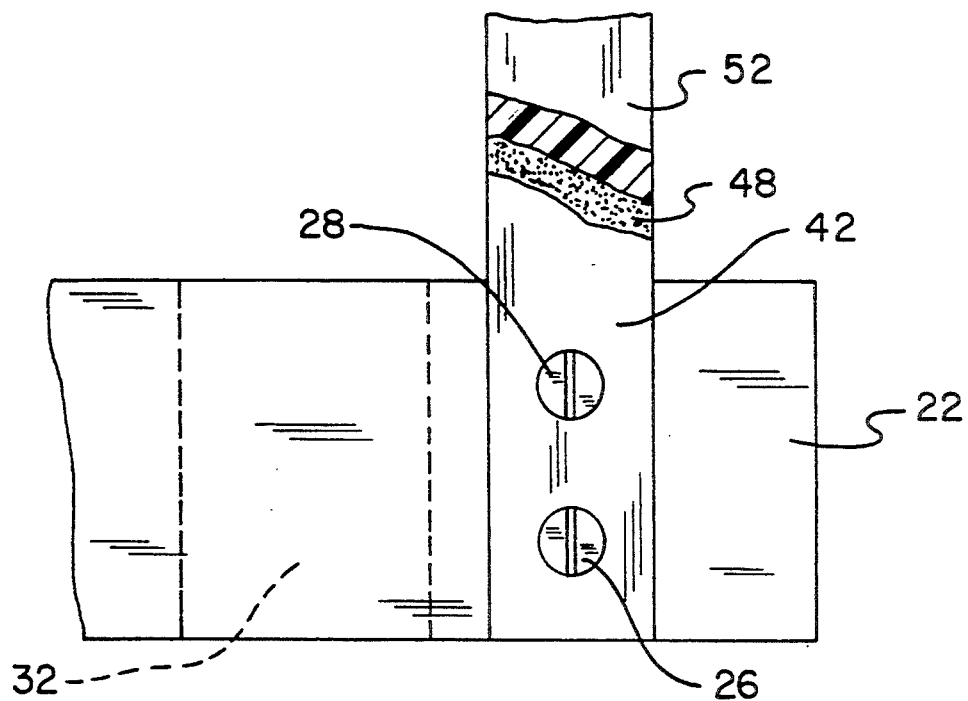
FIG. 7 is a rear elevational partial cutaway detail view of a hanger bracket of the present invention showing its manner of attachment to the upper support structure.

With reference now to the drawings, and in particular to FIG. 1 thereof, a new portable vehicle-mounted gun rack embodying the principles and concepts of the present invention and generally designated by the reference numeral 10 will be described.

From an overview standpoint, the portable vehicle-mounted gun rack is adapted for use for supporting a plurality of long-barreled firearms for safe vehicular transport whereby the firearms are readily accessible and no modification is required to the vehicle. See FIG. 1.

With reference now to FIGS. 1–7 and more specifically, it will be noted that a new portable vehicle-mounted gun rack 10 is shown. The portable vehicle-mounted gun rack 10 comprises a lower floor engagable support structure 70 for receiving three guns 100, 106, and 112 by their respective muzzles 104, 110, and 116. The lower support structure 70 comprises an elongated block 72 formed of wood having three spaced apart upwardly opening gun muzzle sockets 82, 84, and 86 formed therein. The sockets 82, 84, and 86 are positioned longitudinally along the top face of the block 72. The sockets 82, 84, and 86 are also parallel with respect to each other and angled laterally with respect to the block 72 whereby the three guns 100, 106, and 112 may be partially supported by their downwardly angled respective muzzles 104, 110, and 116 when the block 72 is placed on the vehicle floor 124 in front of and parallel with the vehicle seat 126. The block 72 additionally has a non-slip plastic covering 78 fixedly attached to the bottom face thereof with adhesive 76 whereby enhancing frictional engagement of the block 72 with the vehicle floor 124 to preclude unwanted movement of the lower support 70 across the surface of the floor 124.

An upper seat backrest engagable support structure 20 for receiving the three guns 100, 106, and 112 by their respective butts 102, 108, and 114 is also included in the new gun rack 10. The upper support structure 20 comprises an elongated block 22 formed of wood having three spaced apart front facing lateral gun butt slots 32, 34, and 36 formed therein. The slots 32, 34, and 36 are positioned longitudinally along the front face of the block 22 and have the same spacing as the gun muzzle sockets 82, 84, and 86 of the lower support structure 70. The slots 32, 34, and 36 are also parallel with respect to each other and angled laterally with respect to the block 22 whereby the three guns 100, 106, and 112 may be supported by their upwardly angled respective butts 102, 108, and 114 when the block 22 is positioned horizontally against the front surface of the vehicle seat backrest 122 near the top edge thereof. The upper support structure 20 additionally has a hanger bracket 40 attached to the back face of the block 22 near both ends thereof with two wood screws 26 and 28 whereby the upper support 22 may be removedly suspended from the top edge of the vehicle seat backrest 122 so to be positioned horizontally against the front surface near the top edge thereof.

The hanger brackets 40 are identical to each other, each hanger bracket 40 comprising an inverted generally U-shaped hook member 42 formed of resilient metal. The hook member 42 has dimensions to fit over the top edge of a conventional vehicle bench seat backrest 122. The hook member 42 also has a non-slip plastic covering 52 fixedly attached to the inside surface thereof with adhesive 48 whereby enhancing frictional engagement of the hook member 42 with the seat backrest 122 to preclude unwanted movement of the upper support 20 relative the backrest 122. The upper support structure 20 is cooperably aligned with the lower support structure 70 so the combined support structures 20 and 70 in combination with the vehicle floor 124 and seat backrest 122 define a rack 10 wherein the guns 100, 106, and 112 are firmly held in bridging fashion between the upper and lower support structures 20 and 70.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A new portable vehicle-mounted gun rack, for use in vehicles having a floor with at least one generally horizontal planar portion situated generally in front of a bench seat having an upwardly projecting backrest, for supporting a plurality of long-barreled firearms for safe transport whereby the firearms are readily accessible and no modification is required to the vehicle, the portable vehicle-mounted gun rack comprising:

a lower floor engagable support structure for receiving a plurality of guns by the muzzle, the lower support structure comprising an elongated block formed of dense rigid material having a plurality of spaced apart upwardly opening cylindrical gun muzzle sockets formed therein, the sockets being positioned longitudinally along the top face of the block, the sockets also being parallel with respect to each other and angled laterally with respect to the block whereby the plurality of guns may be partially supported by their downwardly angled muzzles when the block is placed on the vehicle floor in front of and parallel with the vehicle seat, the block additionally having a non-slip covering disposed over the bottom face thereof whereby enhancing frictional engagement of the block with the vehicle floor to preclude unwanted movement of the lower support across the surface of the floor; and an upper separate seat backrest engagable support structure spaced from the lower structure for receiving the plurality of guns by the butt, the upper support structure comprising an elongated block formed of dense rigid material having a plurality of spaced apart front facing lateral gun butt slots formed therein, the slots being positioned longitudinally along the front face of the block and having the same spacing as the gun muzzle sockets of the lower support structure, the slots also being parallel with respect to each other and angled laterally with respect to the block whereby the plurality of guns may be supported by their upwardly angled butts when the block is positioned horizontally against the front surface of the vehicle seat backrest near the top edge thereof, the upper support structure additionally having a hanger bracket attached to the back face of the block near both ends thereof whereby the upper support may be removedly suspended from the top edge of the vehicle seat backrest so to be positioned horizontally against the front surface near the top edge thereof, the hanger brackets being identical to each other, each hanger bracket comprising an inverted generally U-shaped hook member formed of resilient material, the hook member having dimensions to fit over the top edge of a conventional vehicle bench seat backrest, the hook member also having a non-slip covering disposed over the inside surface thereof whereby enhancing frictional engagement of the hook member with the seat backrest to preclude unwanted movement of the upper support relative the backrest, the upper support structure being cooperably aligned with the lower support structure so the combined support structures in combination with the vehicle floor and seat backrest define a rack wherein the guns are firmly held in bridging fashion between the upper and lower support structures.

2. A new portable vehicle-mounted gun rack, for use in vehicles having a floor with at least one generally horizontal planar portion situated generally in front of a bench seat having an upwardly projecting backrest, for supporting a plurality of long-barreled firearms for safe transport whereby the firearms are readily accessible and no modification is required to the vehicle, the portable vehicle-mounted gun rack comprising:

lower floor engagable support structure for receiving a plurality of guns by the muzzle; and upper seat backrest engagable support structure, the upper support structure being a separate, spaced structure from the lower support structure, the upper support structure for receiving the plurality of guns by the butt, the upper support structure being cooperably aligned with the lower support structure so the combined support structures in combination with the vehicle floor and seat backrest define a rack wherein the guns are firmly held in bridging fashion between the upper and lower support structures.

3. The portable vehicle-mounted gun rack of claim 2 wherein the lower support means comprises an elongated block formed of dense rigid material having a plurality of spaced apart upwardly opening gun muzzle sockets formed therein.

4. The portable vehicle-mounted gun rack of claim 3 wherein the lower support means further includes means to prevent slipping attached to the bottom face of the block.

5. The portable vehicle-mounted gun rack of claim 4 wherein the upper support means comprises an elongated block formed of dense rigid material having a plurality of spaced apart front facing lateral gun butt slots formed therein and attachment means whereby the upper support means may be removedly attached to the seat backrest.

6. The portable vehicle-mounted gun rack of claim 5 wherein the attachment means comprises an inverted generally U-shaped hanger bracket connected to the back face of the block near both ends thereof whereby the upper support means may be suspended horizontally from the top edge of the vehicle seat backrest.

7. The portable vehicle-mounted gun rack of claim 6 wherein the hanger bracket further includes means to prevent slipping attached to the inside surface thereof.

* * * * *